United States Patent Office 3,151,038
Patented Sept. 29, 1964

3,151,038
PROCESS FOR THE PRODUCTION OF
FUNGAL PROTEIN
William D. Gray, Columbus, Ohio, assignor to The Ohio State University Research Foundation, Columbus, Ohio, a corporation of Ohio
No Drawing. Filed Aug. 24, 1962, Ser. No. 219,110
20 Claims. (Cl. 195—32)

The present invention relates to the microbiological production of protein by organisms of the class Fungi Imperfecti (Deuteromycetes) and is more particularly concerned with such a process whereby using inorganic nitrogen and inexpensive non-protein organic nitrogen compounds, carbohydrates may be converted to protein by fungi of the Fungi Imperfecti orders, namely, Phomales, Melanconiales, Moniliales and Mycelia Sterilia. The process of the invention is designed specifically to provide a means of producing more protein per unit area of land by conversion to protein of carbohydrate, whether refined or crude, synthesized by green plants growing on that land.

The production of protein material by certain species of higher fungi is known, but these organisms grow rather slowly and any process for the production of protein therewith would leave much to be desired. The Fungi Imperfecti, in contrast, grow rapidly, but to the best of my knowledge members of the class Fungi Imperfecti have not previously been reported to synthesize protein from carbohydrates.

It has now been found that microorganisms of the class Fungi Imperfecti are able to convert carbohydrate to protein when cultured in media containing assimilable carbohydrate and a nitrogen source, and that this capacity is a general characteristic of the class. It has moreover been found that this capacity is greatly enhanced by including in the culture a zinc salt in amounts far in excess of the traces usually employed in synthetic media and that optimum amounts of zinc salt according to the invention are far in excess of those amounts which normally effect inhibition and death of green plants. It has further been found that yields of desired protein may be greatly increased by incorporating sea water as a part of the synthetic aqueous media in which the fungus is cultured.

It is accordingly an object of the invention to provide a process for the conversion of carbohydrates to protein by fungi of the class Fungi Imperfecti. Another object is the provision of such a process for the conversion of carbohydrates to protein by fungi of the class Fungi Imperfecti, which process can utilize an inorganic nitrogen source or an inexpensive non-protein organic nitrogen source. A further object is the provision of such a process wherein the fungus is cultured in a synthetic medium to which relatively high amounts of zinc are added. A still further object is the provision of such a process which employs sea water as a part of the aqueous synthetic medium in which the fungus is cultured. Other objects will be apparent to one skilled in the art and still other objects will become apparent hereinafter.

The process of the invention consists essentially in (I) aerobically culturing a species of fungus of the class Fungi Imperfecti (Deuteromycetes) in a synthetic aqueous medium under conditions supporting growth of the fungus, the medium including the following ingredients:

(1) A source of assimilable carbohydrate,
(2) A nitrogen source which is either a water-soluble inorganic nitrogen source or a non-protein organic nitrogen source or both, and
(3) A zinc salt in amount between about 30 parts per million by weight of the medium and that amount which inhibits growth of the microorganism, and (II) separating the protein-containing fungal tissue from the culture medium.

In general, the process including non-critical aspects may involve preparation of a suitable medium containing carbohydrate (crude or refined), a suitable nitrogen source, and various additives as desired. The major constituent of the medium is in any event water, preferably sea water, because of increased yields of protein attendant upon its use. The selected medium is then placed in tanks equipped with aeration and/or agitation devices, whereafter the medium is inoculated with spores, preferably pregerminated spores, or properly macerated mycelium of the selected fungus species. The fungus is then grown aerobically by either surface or submerged culture, with submerged culture being preferred, and in either event the fungal growth takes place in the medium. The culture is continued under controlled conditions for a period sufficient to permit maximum growth and thus to obtain maximum protein content in the fungal tissue product. The fungal tissue product is then separated from the culture medium, as by filtration, centrifugation, or the like, whereafter the recovered tissue may be dried or otherwise processed with regard for the nature of the final edible protein product desired, and converted into forms suitable for use as food for animals or humans. Recovery of suspended and dissolved solids from the spent culture medium may be effected when of value.

THE FUNGI EMPLOYED

The fungi employed according to the invention are the Fungi Imperfecti (Deuteromycetes). The orders of this class are Phomales, Melanconiales, Moniliales, and Mycelia Sterilia. Following is a classification of the Fungi Imperfecti listing, in their proper families and orders, representative species of the class which are operative in the fungal synthesis of protein. The largest concentrations are found in the families Moniliaceae and Dematiaceae, because these are the largest families. The classification is based upon that of Clements, F. E. and Shear, C. L., 1931, "The Genera of Fungi," The H. W. Wilson Company, New York, N.Y.

I. Fungi Imperfecti (form class Deuteromycetes)
   A. Order Phomales (Sphaeropsidales)
      (1) Family Phomaceae (Sphaeropsidaceae)
         (a) Dendrophoma spp.
         (b) Phyllosticta spp.
         (c) Phoma spp.
         (d) Plenodomus spp.
         (e) Cytospora spp.
         (f) Fusicoccum spp.
         (g) Dothiorella spp.
         (h) Sphaeropsis spp.
         (i) Chaetomella spp.
         (j) Diplodia spp.
         (k) Septoria spp.

(2) Family Zythiaceae (Nectrioidaceae)
    (a) Pseudodiplodia spp.
    (b) Diplodia spp.
(3) Family Leptostromaceae
    (a) Kabatia spp.
    (b) Leptostromella spp.
    (c) Kabatiella spp.
(4) Family Discellaceae (Excipulaceae)
    (a) Sporonema spp.
    (b) Coniothyris spp.
    (c) Hainesia spp.

B. Order Melanconiales
  (1) Family Melanconiaceae
    (a) Colletotrichum spp.
    (b) Vermicularia spp.
    (c) Gloeosporium spp.
    (d) Melanconium spp.
    (e) Septomyxa spp.
    (f) Pestalozzia spp.
    (g) Coryneum spp.

C. Order Moniliales
  (1) Family Moniliaceae
    (a) Fusidium spp.
    (b) Monilia spp.
    (c) Oidium spp.
    (d) Gliocladium spp.
    (e) Amblyosporium spp.
    (f) Oedocephalum spp.
    (g) Hyalopus spp.
    (h) Cephalosporium spp.
    (i) Trichoderma spp.
    (j) Botryosporium spp.
    (k) Cylindrocephalum spp.
    (l) Spicaria spp.
    (m) Verticilliopsis spp.
    (n) Verticillium spp.
    (o) Calcarisporium spp.
    (p) Acrostalagmus spp.
    (q) Haplaria spp.
    (r) Botrytis spp.
    (s) Acremonium spp.
    (t) Sepedonium spp.
    (u) Pellicularia spp.
    (v) Diplosporium spp.
    (w) Arthrobotrys spp.
    (x) Cephalothecium spp.
    (y) Trichothecium spp.
    (z) Mycogone spp.
    (aa) Dactylium spp.
    (bb) Piricularia spp.
    (cc) Helicomyces spp.
    (dd) Linderina pennispora
    (ee) Beauveria spp.
  (2) Family Dematiaceae
    (a) Hormiscium spp.
    (b) Echinobotryum spp.
    (c) Thielaviopsis spp.
    (d) Chalaropsis spp.
    (e) Dematium spp.
    (f) Hormodendrum spp.
    (g) Stachybotrys spp.
    (h) Periconia spp.
    (i) Gonatobotryum spp.
    (j) Monatospora spp.
    (k) Acremoniella spp.
    (l) Botryotrichum spp.
    (m) Verticillicladium spp.
    (n) Mesobotrys spp.
    (o) Chloridium spp.
    (p) Bispora spp.
    (q) Beltrania spp.
    (r) Cordana spp.
    (s) Cladosporium spp.
    (t) Septonema spp.
    (u) Sporoschisma spp.
    (v) Dendryphium spp.
    (w) Heterosporium spp.
    (x) Brachysporium spp.
    (y) Helminthosporium spp.
    (z) Coniothecium spp.
    (aa) Alternaria spp.
    (bb) Stemphylium spp.
    (cc) Macrosporium spp.
    (dd) Cercospora spp.
    (ee) Helicoma spp.
    (ff) Helicosporium spp.
  (3) Family Tuberculariaceae
    (a) Volutella spp.
    (b) Tubercularia spp.
    (c) Fusarium spp.
    (d) Troposporium spp.
    (e) Myriothecium spp.
    (f) Papularia spp.
    (g) Epicoccum spp.
    (h) Spegazzinia spp.
    (i) Troposporella spp.
  (4) Family Stilbaceae
    (a) Coremium spp.
    (b) Heterocephalum aurantiacum
    (c) Stilbum spp.
    (d) Isaria spp.
    (e) Didymostilbe spp.
    (f) Trichurus spp.
    (g) Stysanus spp.
    (h) Graphium spp.
    (i) Dendrographium spp.

D. Order Mycelia Sterilia
    (a) Rhizoctonia spp.
    (b) Sclerotium spp.
    (c) Ozonium spp.

Certain species of the class Fungi Imperfecti are known or suspected of being human pathogens, and for obvious reasons human pathogens are undesirable fungal agents for use in the present invention, which is accordingly limited to the employment of species and strains which are not human pathogens. Genera of the class Fungi Imperfecti which are recognized as including such known or suspected human pathogenic species are Coccidioides, Candida, Cryptococcus, Epidermophyton, Achorion, Histoplasma, Microsporon, Sporotrichum, Trichophyton, Phialophora, Blastomyces, Debaryomyces, Rhinotrichum, and Geotrichum. Non-human pathogenic species and strains of these genera are operative in the process of the invention and are otherwise suitable for such use.

According to accepted practice, many of the microorganisms employed in the actual practice of the invention were identified only as to genus and not species. In such case, the trivial designation "sp." follows the generic designation. When referring to a plurality of species in the same genus, the trivial designation "spp." is employed.

Of the Fungi Imperfecti which may be employed, species of the genera Spicaria, Heterocephalum, Linderina, Epicoccum, Cladosporium, Brachysporium, Myriothecium, Cephalothecium, Bispora, Colletotrichum, Trichoderma, and Graphium are preferred for one or more reasons associated with yield of dried mycelial product, percentage of protein, or high efficiency due to maximum growth and/or productivity in a relatively short growing period.

THE MEDIUM

In general, any medium suitable for supporting the growth of the selected fungus species may be employed. Many such media are known, and in general any culture media already reported to support growth of a particular species may be used. In cases where a universal medium is of interest, the "standard medium" as set forth hereinafter may be utilized.

As to the *carbohydrate* content of the media, this is essential to provide the carbon for conversion to protein as well as to support life of the microorganism. Innumerable carbohydrates have been employed and found operative, and the carbohydrate need only be assimilable or utilizable by the microorganism being cultured, no limitations or restriction on type or source of the carbohydrate being known. The carbohydrate may for example be either crude or refined.

The *nitrogen source* which is obviously necessary to provide the nitrogen of the protein product may be inorganic or organic or both. If organic, the less expensive the nitrogen source, the greater the economic advantage of the process. Obviously, no economic advantage is obtained by converting protein to protein or expensive organic nitrogen sources to protein, so the least expensive nitrogen source available is preferred. This may be for example liquid or gaseous ammonia, ammonium salts such as ammonium chloride or other halide, ammonium nitrate, or ammonium sulfate or the like, or inorganic nitrates such as ammonium nitrate, alkali and alkaline earth metal nitrates, e.g., sodium nitrate, or even nitric acid in some cases. The inorganic nitrogen source need only be water-soluble to the extent that it can be utilized by the microorganism being cultured. If a non-protein organic nitrogen source is employed, it may for example be a peptide, polypeptide, amino acid, amine, an imide or amide, or a urea, illustratively urea of acetamide.

The *zinc salt* included in the culture may be organic, e.g., zinc acetate, salicylate, propionate or the like, but is preferably inorganic, e.g., the sulfate, chloride or other halide, or the like. Its presence in the culture is essential to high yields of fungal tissue and/or a desirably high percentage of protein therein. Even when it does not appear to increase the weight of dried mycelial product, it increases the percentage of protein therein. The zinc salt is included in an amount between about thirty parts per million by weight of the medium and that amount which inhibits growth of the fungal species involved. Usually the maximum is about 200 p.p.m. Preferably the zinc salt is included in amount between about forty and 100 p.p.m. by weight of the medium, and optimum concentration of the zinc salt appears to be in the neighborhood of 61 p.p.m. by weight of the medium. As with the carbohydrate and nitrogen source constituents of the culture medium, the zinc salt may be added incrementally, intermittently, or continuously during growth of the fungus, especially when using efficient aeration and agitation, or it may all be present in the medium as originally constituted. For obvious reason of convenience and simplicity, the latter mode of operation is preferred.

The employment of *sea water* to replace a part or all of the water of the aqueous medium results in still further increases in yield of mycelium and protein product and is therefore preferred. All or substantially all of the aqueous portion of the medium may be replaced by sea water without noticeable diminution of the advantageous results. This is considered a rather startling phenomenon, inasmuch as the Fungi Imperfecti are largely terrestrial fungi and their inhibition by sea water would be expected.

The conditions for effectively culturing any particular fungal species in the medium are known. Suitable temperatures, pressures, pH, and the like are the same in the present process as for culturing the microorganism for any other purpose. Suitable temperatures are usually 15–37° C. depending upon the species of fungus employed, atmospheric pressure is preferred, agitation is preferred and aeration is essential for maximum growth and protein production, pH is usually two to seven depending upon exact organism, and growth period is usually two to four days depending again upon exact organism and medium composition. Some microorganisms, e.g., of the genus Cladosporium, require only about thirty-hour growth periods. The concentration of protein in the final product usually varies directly with degree of growth of the fungal mycelium, within certain maximal growth periods.

Further data with regard to suitable media follows.

"STANDARD MEDIUM"

Many media have been used and found suitable. "Standard medium" is one in which all Fungi Imperfecti tested will grow satisfactorily, although it is not necessarily the best for all fungi. Components are as follows:

| | |
|---|---|
| Dextrose _____ g__ | 20.0 |
| $KH_2PO_4$ _____ g__ | 5.0 |
| $NH_4NO_3$ or $NH_4Cl$ _____ g__ | 0.6 or 1.0 |
| Corn steeping liquor_____ml__ | 2.0 |
| Trace elements solution [1] _____ml__ | 1.0 |
| $FeCl_3$ solution (1.92 g./liter) _____ml__ | 1.0 |
| $ZnSO_4 \cdot 7H_2O$ solution (44 g./liter) _____ml__ | 1.0 |
| Vitamin solution [2] _____ml__ | 1.0 |

[1] Trace elements solution:

| | G. |
|---|---|
| $H_3BO_3$ | 0.114 |
| $(NH_4)_6Mo_7O_{24} \cdot 4H_2O$ | 0.484 |
| $CuSO_4 \cdot 7H_2O$ | 0.780 |
| $MnCl_2 \cdot 4H_2O$ | 4.144 |
| $ZnSO_4 \cdot 7H_2O$ | 16.720 |

Distilled water—1 liter (this gives 16.72 p.p.m. of Zn in the medium if no more is added).

[2] Vitamin solution:

| | Mg. |
|---|---|
| p-Aminobenzoic acid | 50.3 |
| Thiamin hydrochloride | 99.6 |
| Riboflavin | 50.0 |
| Niacinamide | 200.0 |
| Inositol | 400.0 |
| Calcium pantothenate | 200.0 |
| Pyridoxine | 50.2 |

Distilled water—1 liter.

The above constituents are added to 800 ml. of distilled water, pH adjusted to the optimum for the fungus being used, and the medium then made to final volume of one liter. The medium contains 60.72 p.p.m. of Zn.

OTHER MEDIA

Other media have been prepared using cane sugar as well as carbohydrate-containing crude raw plant products such as: corn, oats, wheat, other cereal grains, various types of blackstrap molasses, various types of beet molasses, root and tuber crops (e.g., potatoes, sweet potatoes, sugar beets, cassava, etc.), and ground wood flours (sycamore, sassafras, tulip popular, white walnut, etc.). The composition of the medium varies with the carbohydrate source and a general formulation showing ranges of added ingredients would be as follows, the exact amounts of each ingredient added depending on the presence or absence of other ingredients which also provide a source of the particular required growth factors involved.

| | |
|---|---|
| Carbohydrate _____g__ | 10–100 |
| $KH_2PO_4$ _____g__ | 0–5 |
| Nitrogen source [1] _____g__ | 0–2 |
| Corn steeping liquor _____ml__ | 0–2 |
| Trace element solution _____ml__ | 0–1 |
| $FeCl_3$ solution _____ml__ | 0–1 |
| $ZnSO_4 \cdot 7H_2O$ solution [1] _____ml__ | 0–1 |
| Vitamin solution _____ml__ | 0–1 |

[1] Nitrogen source only zero when nitrogen provided in another form; same normally true for zinc salt solution.

Above constituents added to 800 ml. water, pH adjusted to 2.5–7.0, and medium made to final volume of one liter.

GENERAL PROCEDURE

The process is conducted in liquid medium in tanks or vats equipped with air spargers and/or mechanical agitators. Fungi are grown submerged in liquid, usually for periods of two to four days, after which fungal tissue is harvested and dried alone or with spent medium which has been concentrated to 30–35% solids. Dried product is to be used as a protein supplement (20–40% protein).

For large-scale laboratory experimentation, "standard" or other medium is prepared, usually in a five-liter lot which is adjusted to a pH value suitable for the fungus being cultured. The medium is then placed in a nine-liter bottle and sterilized by autoclaving. After cooling, the medium is inoculated with spores or fragmented mycelia of the fungus. An aeration device is then fitted to the bottle and the culture incubated, usually for two to four days, with continuous aeration. After the culture has been terminated, the fungus tissue is filtered out, dried and weighed. The dried tissue is subjected to chemical analysis and/or feeding trials.

The usual and most common manner of determining protein is to analyze for total nitrogen by the Kjeldahl procedure and then multiply by 6.25, the standard factor according to accepted practice. Hawk, Philip B., Oser, Bernard L., and Summerson, William H., 1947, Practical Physiological Chemistry, 12th edition, The Blakiston Company, Philadelphia and Toronto, state as follows on pages 213 and 214: "The usual factor employed for the calculation of protein from the nitrogen content is 6.25 and is based on the assumption that proteins contain on the average 16 percent of nitrogen."

MORE SPECIFIC PROCEDURE

A. *Constituents—Culture Medium*

(1) *Water.*—Either fresh or untreated sea water. Preferably the latter because of increased yields.

(2) *Carbohydrate source.*—Crude or refined hexoses, disaccharides or starch or finely ground whole plant parts containing sufficient quantities of such carbohydrates. Final concentration usually 1–10% depending upon local availability and cost. Highest percentage efficiencies (conversion of substrate carbon to tissue carbon) will be obtained at lower sugar concentrations.

(3) *Phosphate.*—Inorganic phosphate such as $KH_2PO_4$ to be added in quantities ranging from 0–5 grams/liter depending upon purity of carbohydrate source and organism being cultured.

(4) *Nitrogen source.*—Preferably added as inorganic nitrates and/or ammonium salts depending upon the choice of fungus. Example: Linderina grows best on $NH_4Cl$; Heterocephalum grows best on $NH_4NO_3$. Inorganic nitrogen salts to be added in amounts ranging from 0–5 grams per liter depending upon purity of carbohydrate source. Example: no nitrogen is added to medium in which high-nitrogen (e.g., 2% N) blackstrap molasses is used as the principal carbohydrate source.

(5) *Zinc salt.*—0 to 180 milligrams per liter depending upon organism used and purity of carbohydrate source (that is, presence of zinc salt in another component).

(6) *Ferric or ferrous salts.*—0 to 5 milligrams per liter depending upon the purity of the carbohydrate source.

(7) *Organic additives.*—Corn steep liquor (0–2 milliliters per liter) or stick liquor (0–5 milliliters per liter) depending upon the purity of the carbohydrate source.

B. *Reaction Adjustment*

The pH is adjusted to pH 2 to 7 depending upon the organism used. This is conveniently accomplished with hydrochloric acid or sodium hydroxide. Examples: Linderina—4–7, optimum at 6; Heterocephalum—5–7, optimum 5.5; Spicaria—optimum 5.4; Brachysporium—optimum 5–6.2; Cladosporium—optimum 5–5.6; Verticillicladium—optimum 5; and Diplosporium—optimum 5.

C. *Sterilization*

Complete medium is preferably sterilized (if adjusted to pH higher than 3.5) either batchwise or continuously by means of injection heater, cooled and delivered to sterilized growth tanks or vats. Some species require sterile media.

D. *Inoculation*

Medium is inoculated (preferably using aseptic techniques) with spore suspension or suspension of fragmented mycelium of selected fungus.

E. *Incubation*

(1) *Aeration.*—Inoculated medium is aerated with sterile air passed through basally located sparging system and/or mechanical agitators.

(2) *Temperature.*—Medium is adjusted to and maintained at a temperature of 15 to 37° C. depending upon the temperature optimum of the fungus involved. Examples: Myriothecium—15–35, preferably 20° C.; Heterocephalum—22–32, preferably 25° C.; Linderina—20–35, preferably 25–30° C.; Brachsporium—optimum 35° C.; Sephalothecium—optimum 30° C.; Bispora—optimum 25° C.; Dactylium—optimum 25° C.; Helminthosporium—optimum 25° C.; Sepedonium—optimum 30° C.; and Cladosporium—optimum 20° C.

(3) *Growth period.*—Two to four days under above conditions. Length of growth period determined by the concentration of protein desired in the final product.

F. *Recovery*

Fungus mycelium recovered by filtration or centrifugation and dried as press cakes, pellets, flakes or powder. Concentration of filtrate and addition to dried tissue depends upon nature and value of dissolved substances in spent growth medium.

The following examples are given by way of illustration only and are not to be construed as limiting.

EXAMPLE 1

*Heterocephalum aurantiacum*

Fifty ml. of medium ("standard medium" containing $NH_4NO_3$ as the nitrogen source) containing pre-germinated spores of *Heterocephalum aurantiacum* were added to five liters of standard medium, pH 6, in a nine-liter carboy which was fitted with an aeration device and incubated at 25–27° C. for four days. At the end of this incubation period, white spherical pellets of fungus mycelium were distributed throughout the medium. The pellets, which resembled cooked tapioca, were harvested on a small mesh screen, washed, dried in a vacuum oven, weighed, and total nitrogen determined.

Total yield (dry weight) _____ g__ 61.8
Percentage protein (Kjeldahl N×6.25) __percent__ 35

EXAMPLE 2

*Effect of Zinc Salt on Yield*

This example was an exact replicate of Example 1 except that no zinc sulphate solution was added. The total yield of dried mycelial tissue was 33.5 g. containing 35% protein.

EXAMPLE 3–20

(See Table I)

TABLE I.—YIELDS OF FUNGUS TISSUE FROM CULTURE IN STANDARD MEDIUM

[Large bottle—five-liter culture; four-day incubation]

| Fungus | Nitrogen Source | Dry Wt. Yield (grams) | Percent Protein |
|---|---|---|---|
| Bispora sp | $NH_4Cl$ | 31.2 | 20.32 |
| Spicaria sp | $NH_4Cl$ | 32.6 | 27.33 |
| Cladosporium sp | $NH_4Cl$ | 45.7 | 9.71 |
| Colletotrichum sp | $NH_4NO_3$ | 55.2 | 11.56 |
| Pullularia sp. (1) | $NH_4Cl$ | 20.6 | 19.27 |
| Gliocladium sp | $NH_4NO_3$ | 35.7 | 18.92 |
| Helminthosporium sp | $NH_4NO_3$ | 9.9 | 29.44 |
| Spegazzinia sp | $NH_4NO_3$ | 12.6 | 20.66 |
| Pullularia sp. (2) | $NH_4Cl$ | 51.8 | |
| Stemphylium sp | $NH_4NO_3$ | 12.5 | 14.02 |
| Sepedonium sp | $NH_4NO_3$ | 34.3 | 16.80 |
| Spicaria sp. (1) | $NH_4NO_3$ | 13.8 | 19.36 |
| Brachysporium sp | $NH_4NO_3$ | 13.7 | 17.51 |
| Trichurus sp | $NH_4NO_3$ | 34.3 | 18.91 |
| Geomyces sp. (1) | $NH_4NO_3$ | 12.1 | 25.25 |
| Cephalothecium sp | $NH_4NO_3$ | 14.2 | 27.25 |
| Spicaria sp. (2) | $NH_4NO_3$ | 41.1 | 25.25 |
| Geomyces sp. (2) | $NH_4NO_3$ | 22.4 | 25.92 |

EXAMPLES 21–29

(Crude raw plant materials substituted for dextrose in "standard medium." Large bottle cultures.)

EXAMPLE 21

*Linderina pennispora* was cultured in medium in which 150 g. whole dry corn was substituted for 100 g. dextrose. Four-day culture.

| | | |
|---|---|---|
| Yield (dry weight) | g | 100.3 |
| Protein | percent | 20.32 |
| Total protein in corn initially | g | 10.5 |
| Total protein in final product | g | 20.4 |

EXAMPLE 22

*Cladosporium* sp. was cultured in medium in which 355 g. minced whole sweet potato were substituted for 100 g. dextrose. Four-day culture.

| | | |
|---|---|---|
| Yield (dry weight) | g | 96.3 |
| Protein | percent | 22.75 |
| Protein initially in sweet potato | g | 7.98 |
| Protein in final product | g | 21.90 |

EXAMPLE 23

*Myriothecium* sp. was cultured in medium in which carbohydrate source was 50 g. dextrose plus 50 g. ground tulip poplar wood. Four-day culture.

| | | |
|---|---|---|
| Yield (dry weight) | g | 72.8 |
| Protein | percent | 11.10 |
| Protein initially in ground wood | g | 0.25 |
| Protein in final product | g | 8.08 |

EXAMPLE 24

*Spicaria* sp. was cultured in medium in which carbohydrate source was 195 g. blackstrap molasses. Four-day culture.

| | | |
|---|---|---|
| Yield (dry weight) | g | 31.5 |
| Protein | percent | 30.0 |
| Protein in final product | g | 9.45 |

EXAMPLE 25

*Brachysporium* sp. was cultured in medium in which carbohydrate source was 195 g. blackstrap molasses. Four-day culture.

| | | |
|---|---|---|
| Yield (dry weight) | g | 33.5 |
| Protein | percent | 20.2 |
| Protein in final product | g | 6.76 |

EXAMPLE 26

*Spicaria* sp. was cultured in medium in which carbohydrate source was 195 g. beet molasses. Two-day culture.

| | | |
|---|---|---|
| Yield (dry weight) | g | 39.9 |
| Protein | percent | 18.43 |
| Total protein in final product | g | 7.34 |

EXAMPLE 27

Same as Example 26 but with three-day growth period.

| | | |
|---|---|---|
| Yield (dry weight) | g | 41.0 |
| Protein | percent | 16.68 |
| Total protein in final product | g | 6.84 |

EXAMPLE 28

Same as Examples 26 and 27 but with four-day growth period.

| | | |
|---|---|---|
| Yield (dry weight) | g | 45.0 |
| Protein | percent | 20.83 |
| Total protein in final product | g | 9.37 |

EXAMPLE 29

*Spicaria* sp. was cultured in a five-liter bottle of standard medium in which urea (three grams total) was used as nitrogen source instead of $NH_4Cl$ or $NH_4NO_3$. Three-day culture. Yield (dry weight), 41.0 g.

EXAMPLES 30–49

Effect of Sea Water Upon Yields of Fungal Tissue

The medium was "standard medium" containing either ammonium nitrate or ammonium chloride. Yields are milligrams dry weight per 50 ml. culture.

| Fungus | Nitrogen Source | Yield (mg./50 ml.) | |
|---|---|---|---|
| | | Sea water Medium | Fresh water Medium |
| Phoma sp. | $NH_4NO_3$ | 868 | 484 |
| Cephalothecium sp. | $NH_4NO_3$ | 576 | 438 |
| Cylindrocephalum sp. | $NH_4NO_3$ | 322 | 171 |
| Geomyces sp. | $NH_4NO_3$ | 782 | 449 |
| Linderina pennispora | $NH_4Cl$ | 306 | 256 |
| Sepedonium sp. | $NH_4Cl$ | 235 | 155 |
| Spicaria sp. | $NH_4Cl$ | 564 | 482 |
| Tritirachium sp. | $NH_4NO_3$ | 242 | 84 |
| Bispora sp. | $NH_4Cl$ | 210 | 146 |
| Brachysporium sp. | $NH_4NO_3$ | 611 | 431 |
| Cladosporium sp. | $NH_4Cl$ | 701 | 377 |
| Curvularia sp. | $NH_4Cl$ | 957 | 583 |
| Pullularia sp. | $NH_4NO_3$ | 621 | 442 |
| Stemphylium sp. | $NH_4NO_3$ | 871 | 525 |
| Verticillicladium sp. | $NH_4Cl$ | 777 | 552 |
| Epicoccum sp. | $NH_4NO_3$ | 532 | 402 |
| Myriothecium sp. | $NH_4NO_3$ | 450 | 417 |
| Spegazzinia sp. | $NH_4NO_3$ | 410 | 300 |
| Heterocephalum aurantiacum | $NH_4NO_3$ | 271 | 207 |
| Ozonium sp. | $NH_4Cl$ | 572 | 406 |

EXAMPLE 50

Example in Which Protein is Extracted

*Spicaria* sp. was cultured in a five-liter bottle. Standard medium. Four-day culture. Yield (dry weight), 40.0 g.

The culture was effected in the usual manner. The procedure utilized for extracting the protein was as follows:

(1) Four-tenths gram of dried fungus mycelium was ground in a mortar for 15 minutes with 1.6 g. of 250-mesh powdered flint and 2.5 ml. distilled water and then brought to 40 ml. volume with 5% perchloric acid.
(2) Placed in water bath (90–100° C.) for one hour; stirred occasionally.
(3) Centrifuged and supernatant discarded.
(4) Brought to 40 ml. volume again with 5% perchloric acid.
(5) Placed in water bath (90–100° C.) for one hour; stirred occasionally.
(6) Centrifuged and supernatant discarded.
(7) Neutralized with 20% KOH to pH $7.0 \pm 0.2$.
(8) Refrigerated overnight in order to permit potassium perchlorate to precipitate out.
(9) Protein determination on supernatant using Folin-Ciocalteau phenol reagent. (This is an accepted standard protein determination procedure. Standard is crystalline albumin.)

In this manner, the percentage of protein in the dried fungal mycelium was determined to be 24.4%.

EXAMPLES 51–60

Additional examples showing the effect of zinc salt on the yield of various Fungi Imperfecti.

EXAMPLE 51

Standard medium as outlined earlier. Four-day, five-liter cultures. Organism: *Myriothecium* sp.

| Yield (dry weight): | G. |
|---|---|
| Plus $ZnSO_4$ solution | 35.9 |
| No added $ZnSO_4$ solution | 24.1 |

EXAMPLES 52-60

*Standard Medium With and Without ZnSO₄ Solution Added*

[Four-day, 50 ml. cultures (replicated six times)]

| Organism | Yield (dry wt.) | |
| --- | --- | --- |
| | +ZnSO⁴ Solution, mg. | −ZnSO⁴ Solution, mg. |
| Linderina pennispora | 318 | 292 |
| Cephalothecium sp | 438 | 420 |
| Bispora sp | 146 | 55 |
| Pullularia sp | 621 | 449 |
| Cladosporium sp | 505 | 306 |
| Curvularia sp | 583 | 346 |
| Geomyces sp | 611 | 473 |
| Brachysporium sp | 431 | 380 |
| Stemphylium sp | 525 | 327 |

EXAMPLE 61

*Growth of Representative Fungi Imperfecti with Inorganic Nitrogen Sources*

[Standard medium without corn steep liquor; five-day small flask, still cultures]

| Fungus | Growth | |
| --- | --- | --- |
| | NH₄Cl | NaNO₃ |
| Calcarisporium sp | 3 | 2 |
| Gliocladium sp. (1) | 3 | 3 |
| Gliocladium sp. (2) | 2 | 1 |
| Stilbella sp | 1 | * |
| Chalaropsis sp | 2 | 2 |
| Sporonema sp | 3 | 2 |
| Kabatia sp | 3 | 2 |
| Stysanus sp | 3 | 3 |
| Cephalothecium sp | 3 | 1 |
| Sclerotium sp | 2 | 2 |
| Graphium sp | 3 | 3 |
| Beauveria sp | 2 | 2 |
| Trichoderma sp | 3 | 1 |
| Pseudodiplodia sp | 3 | 2 |
| Vermicularia sp | 1 | 3 |
| Speggazinia sp | 2 | 1 |
| Bispora sp | 2 | 2 |
| Hormiactella sp | 2 | 1 |
| Linderina pennispora | 4 | 1 |
| Coryneum sp | 2 | 2 |
| Trichothecium sp | 2 | 1 |
| Haplographium sp | 1 | 1 |
| Cytospora sp | 2 | 2 |
| Trichurus sp | 2 | * |
| Amblyosporium sp | 2 | 2 |
| Papularia sp | 3 | 3 |
| Cephalosporium sp | 3 | 2 |
| Mycogone sp | 2 | 3 |
| Margarinomyces sp | 3 | * |
| Dactylium sp | 1 | 1 |
| Mesobotrys sp | 1 | * |
| Paecilomyces sp | 2 | 2 |
| Botrytis sp | 2 | 2 |
| Septomyxa sp | 3 | 3 |
| Septoria sp | 2 | 2 |
| Epicoccum sp | 2 | 2 |
| Diplosporium sp | | |

4 = entire surface.
3 = one-half surface covered.
2 = one-fourth surface covered.
1 = growth, less than one-fourth surface covered.
* = no growth.

The foregoing example illustrates that species of all genera tested can utilize either ammonium or nitrate nitrogen and that most species will utilize either as sole nitrogen source.

Various modifications and substitutions of equivalents will be apparent to one skilled in the art and may be made without departing from the spirit and scope of the invention, wherefore the invention is to be limted only by the scope of the appended claims.

I claim:

1. A process for the microbiological production of protein which comprises the steps of
    (I) aerobically culturing a species of fungus of the class Fungi Imperfecti (Deuteromycetes) which is non-pathogenic to humans in an aqueous medium under conditions which support growth of the fungus, said culture including the following:
        (1) a source of assimilable carbohydrate,
        (2) a nitrogen source selected from the group consisting of
            (a) a water-soluble inorganic nitrogen source and
            (b) a non-protein organic nitrogen source, and
        (3) a zinc salt in amount between about thirty parts per million by weight of the medium and that amount which inhibits growth of the fungus, and
    (II) separating the protein-containing fungal tissue from the culture medium.

2. The process of claim 1, wherein the zinc salt is present between about 30 and 200 parts per million by weight of the medium.

3. The process of claim 1, wherein the fungus is a species of the genus Spicaria and wherein a zinc salt is included in the culture in amount between about 40 and 100 parts per million by weight of the medium.

4. The process of claim 1, wherein the fungus is a species of the genus Heterocephalum and wherein a zinc salt is included in the culture in amount between about 40 and 100 parts per million by weight of the medium.

5. The process of claim 1, wherein the fungus is a species of the genus Linderina and wherein a zinc salt is included in the culture in amount between about 40 and 100 parts per million by weight of the medium.

6. The process of claim 1, wherein the fungus is a species of the genus Epicoccum and wherein a zinc salt is included in the culture in amount between about 40 and 100 parts per million by weight of the medium.

7. The process of claim 1, wherein the fungus is a species of the genus Cladosporium and wherein a zinc salt is included in the culture in amount between about 40 and 100 parts per million by weight of the medium.

8. The process of claim 1, wherein the fungus is a species of the genus Brachysporium and wherein a zinc salt is included in the culture in amount between about 40 and 100 parts per million by weight of the medium.

9. The process of claim 1, wherein the fungus is a species of the genus Myriothecium and wherein a zinc salt is included in the culture in amount between about 40 and 100 parts per million by weight of the medium.

10. The process of claim 1, wherein the fungus is a species of the genus Cephalothecium and wherein a zinc salt is included in the culture in amount between about 40 and 100 parts per million by weight of the medium.

11. The process of claim 1, wherein the fungus is a species of the genus Bispora and wherein a zinc salt is included in the culture in amount between about 40 and 100 parts per million by weight of the medium.

12. The process of claim 1, wherein the fungus is a species of the genus Colletotrichum and wherein a zinc salt is included in the culture in amount between about 40 and 100 parts per million by weight of the medium.

13. The process of claim 1, wherein the fungus is a species of the genus Trichoderma and wherein a zinc salt is included in the culture in amount between about 40 and 100 parts per million by weight of the medium.

14. The process of claim 1, wherein the fungus is a species of the genus Graphium and wherein a zinc salt is included in the culture in amount between about 40 and 100 parts per million by weight of the medium.

15. The process of claim 1, wherein an inorganic nitrogen source is included in the culture.

16. The process of claim 1, wherein an ammonium salt is included as a nitrogen source and wherein an inorganic zinc salt is included in the culture in amount between about 40 and 100 parts per million by weight of the medium.

17. The process of claim 1, wherein an inorganic nitrate is included as a nitrogen source and wherein an inorganic zinc salt is included in the culture in amount between about 40 and 100 parts per million by weight of the medium.

18. The process of claim 1, wherein urea is included as a nitrogen source and wherein an inorganic zinc salt is included in the culture in amount between about 40 and 100 parts per million by weight of the medium.

19. The process of claim 1, wherein sea water is included in the culture.

20. The process of claim 1, wherein sea water is included in the culture and wherein an inorganic zinc salt is included in the culture in amount between about 40 and 100 parts per million by weight of the medium.

References Cited in the file of this patent

Foster: Chemical Activities of Fungi, Academic Press Inc., publishers, New York 1949. Pages 272 to 276 and 485 to 502.

UNITED STATES PATENT OFFICE
CERTIFICATE OF CORRECTION

Patent No. 3,151,038                      September 29, 1964

William D. Gray

It is hereby certified that error appears in the above numbered patent requiring correction and that the said Letters Patent should read as corrected below.

Column 5, line 4, for "restriction" read -- restrictions --; line 25, for "of" read -- or --; line 46, for "reason" re -- reasons --; column 6, line 19, for "4.144" read -- 0.144 -- column 8, line 6, for "Brachsporium" read -- Brachysporium -- line 7, for "Sephalothecium" read -- Cephalothecium --; same column 8, line 48, for "EXAMPLE 3-20" read -- EXAMPLES 3-20 --.

Signed and sealed this 30th day of March 1965.

(SEAL)
Attest:

ERNEST W. SWIDER
Attesting Officer

EDWARD J. BRENNE
Commissioner of Patents